United States Patent [19]

Czuszak

[11] 4,327,950
[45] May 4, 1982

[54] BEARING AND LUBRICATION SYSTEM
[75] Inventor: Charles C. Czuszak, Greensburg, Pa.
[73] Assignee: Elliott Turbomachinery Co., Inc., Jeannette, Pa.
[21] Appl. No.: 165,321
[22] Filed: Jul. 2, 1980

Related U.S. Application Data

[62] Division of Ser. No. 24,831, Mar. 29, 1979, Pat. No. 4,243,275.
[51] Int. Cl.³ .............................................. B61F 17/16
[52] U.S. Cl. .................................. 308/128; 308/85 B; 308/168; 184/11 R
[58] Field of Search ........................... 184/11 R, 11 A; 308/85 B, 168, 170, 171, 128, 129

[56] References Cited

U.S. PATENT DOCUMENTS

| | | | |
|---|---|---|---|
| 1,179,846 | 4/1916 | Lassmann | 308/85 B |
| 1,564,832 | 12/1925 | Dana | 308/128 |
| 2,729,307 | 1/1956 | Perrin | 184/11 R |
| 3,324,970 | 6/1967 | McHugh | 184/31 X |
| 3,499,503 | 3/1970 | Murray et al. | 184/11 R X |
| 3,544,179 | 12/1970 | De Leu | 308/168 |
| 3,777,851 | 12/1973 | Mitchell et al. | 308/85 B X |
| 3,826,338 | 7/1974 | Mair | 184/11 A |
| 3,857,462 | 12/1974 | Kaufman et al. | 308/85 B X |
| 4,144,950 | 3/1979 | Moyer et al. | 60/39.08 X |
| 4,251,186 | 2/1981 | Chomel et al. | 308/84 X |

*Primary Examiner*—David H. Brown
*Attorney, Agent, or Firm*—J. Raymond Curtin; John S. Sensny

[57] ABSTRACT

A bearing and lubrication system for a rotatable shaft comprising a journal bearing assembly for supporting the shaft, a thrust bearing assembly for limiting axial movement of the shaft, and a ring surrounding the shaft and having a portion of the inner surface thereof drivingly engaged by the shaft wherein rotation of the shaft causes rotation of the rings. A supply of lubricant is disposed beneath the ring in the path of travel thereof as the ring rotates under the influence of the shaft, wherein rotation of the ring causes lubricant to cling thereto and be elevated thereby. A first portion of the elevated lubricant is introduced to the journal bearing assembly to lubricate surfaces thereof, and a second portion of the elevated lubricant is radially thrown outward by the ring. The bearing and lubrication system further comprises collecting troughs for collecting lubricant radially thrown outward by the ring, and a plurality of channels for conducting lubricant from the collecting troughs into the thrust bearing assembly to lubricate surfaces thereof.

3 Claims, 3 Drawing Figures

4,327,950

1

BEARING AND LUBRICATION SYSTEM

This application is a division of application Ser. No. 24,831, filed Mar. 29, 1979, now U.S. Pat. No. 4,243,275.

BACKGROUND OF THE INVENTION

This invention relates generally to a bearing and lubrication system for a rotating shaft, and more particularly to systems of the type employing oil rings to deliver a lubricant from a supply thereof to a bearing assembly.

Rotating machinery such as gas or steam powered turbines typically include a power shaft, one or more sleeve or journal bearing assemblies to rotatably support the shaft, and one or more thrust bearing assemblies to limit axial movement of the shaft. Lubricant must be supplied to these bearing assemblies, and often the bearing assemblies of a rotating machinery are spaced from each other and a separate lubrication system is provided for each bearing assembly. Many lubrication systems are well known in the art, and one common type of system includes an oil ring or rings arranged within a bearing assembly so as to encircle the power shaft. The oil ring has a diameter greater than the diameter of the shaft, and the ring is positioned above a pool of lubricant so that at least a portion of the circumference of the ring is submerged within the lubricant. Rotation of the power shaft within the bearing assemblies causes rotation of the oil ring. As the oil ring rotates and travels through the supply of lubricant, lubricant clings to the oil ring and is carried upward thereby. The inner surface of the oil ring is usually provided with grooves or the like to increase the amount of oil which clings to the ring and is carried upward thereby. Oil carried upward by the inner surfaces of the oil ring is deposited on and migrates along the bearing surfaces of a bearing assembly, lubricating these surfaces. Oil carried upward by the outside surfaces of the oil ring is thrown radially outward by the ring toward the shell or casing of the machinery, and this oil generally flows down the inside surface of the shell, returning to the lubricant pool.

As the lubricant flows along surfaces of the shaft and associated bearing assemblies, the lubricant is heated by friction between these surfaces. Often, the lubricant is cooled by being circulated through a heat exchanger. In this case, a lubricant pump is frequently employed to circulate the lubricant between the supply thereof and the heat exchanger. This pump and its associated piping increase the cost and complexity of manufacturing, operating, and maintaining the rotatable machinery.

SUMMARY OF THE INVENTION

In light of the above, an object of this invention is to improve rotating machinery, particularly bearing and lubrication systems thereof.

Another object of the present invention is to position a thrust bearing assembly within a journal bearing assembly and employ a common set of oil rings to lubricate both bearing assemblies.

A further object of this invention is to lubricate a thrust bearing assembly with lubricant thrown off an oil ring.

Still another object of the present invention is to collect lubricant thrown off an oil ring and direct the lubricant to surfaces of a thrust bearing assembly.

2

These and other objectives are attained with a bearing and lubrication system for a rotatable shaft comprising a journal bearing assembly for supporting the shaft, a thrust bearing assembly for limiting axial movement of the shaft, and a ring surrounding the shaft and having a portion of the inner surface thereof drivingly engaged by the shaft wherein rotation of the shaft causes rotation of the ring. A supply of lubricant is disposed beneath the ring in the path of travel thereof as the ring rotates under the influence of the shaft, wherein rotation of the ring causes lubricant to cling thereto and be elevated thereby. A first portion of the elevated lubricant is introduced to the journal bearing assembly to lubricate surfaces thereof, and a second portion of the elevated lubricant is radially thrown outward by the ring. The bearing and lubrication system further comprises trough means for collecting lubricant radially thrown outward by the ring, and conduit means for conducting lubricant from the trough means into the thrust bearing assembly to lubricate surfaces thereof.

A BRIEF DESCRIPTION OF THE DRAWINGS

A DETAILED DESCRIPTION OF THE PREFERRED EMBODIMENT

Figure 1:
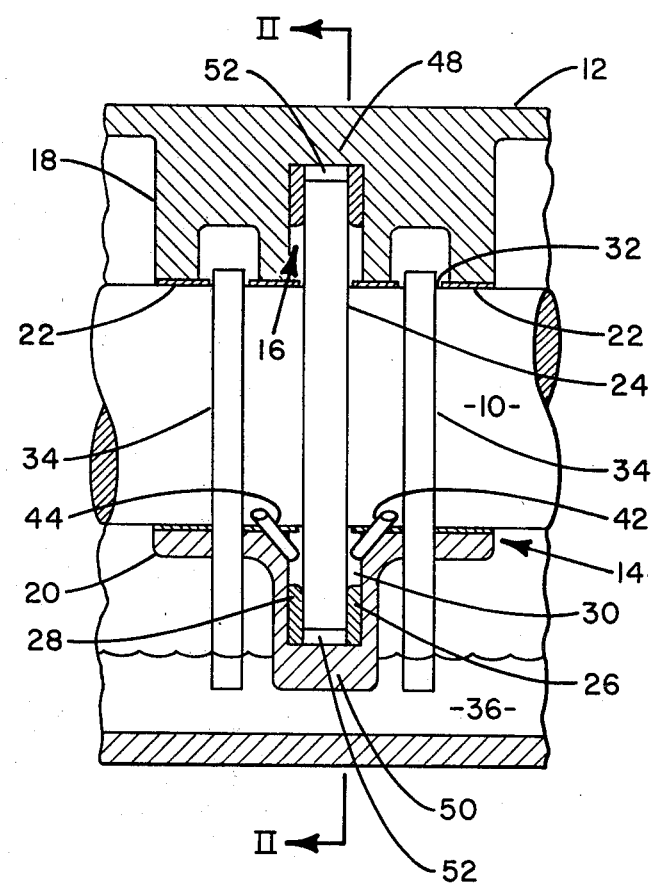
FIG. 1 is a side view, partly in cross-section, of portions of a rotating machine employing the bearing and lubrication system of the present invention.

Machinery of the type to which the bearing and lubrication system forming the subject of the present invention may be applied is illustrated in part in FIG. 1. Power shaft 10 of a machine such as a turbine is shown arranged within casing or housing 12 of the turbine. Housing 12 includes journal bearing assembly 14 for rotatably supporting shaft 10, and thrust bearing assembly 16 for limiting axial movement of the shaft. As is conventional in machinery of a type under consideration, the parts described above with the exception of power shaft 10 are formed in two halves, an upper and lower half, and thereafter united.

Journal bearing assembly 14 includes upper bearing retainer 18, lower bearing retainer 20, and sleeves 22. Retainers 18 and 20 are fixed relative to housing 12 and may be formed integrally therewith. Retainers 18 and 20 encircle power shaft 10, and sleeves 22 are disposed between the bearing retainers and the power shaft. Shaft 10 is supported by and is free to rotate within bearing sleeves 22; and the bearing sleeves, in turn, are supported by and are free to rotate within retainers 18 and 20. Stops (not shown) may be provided to limit axial movement of bearing sleeves 22. A thin film of lubricant (not shown) is maintained between adjacent surfaces of shaft 10, retainers 18 and 20, and sleeves 22, lubricating these surfaces.

Thrust bearing assembly 16 includes thrust collar 24, front thrust plate 26, back thrust plate 28, and lateral cavity 30 which is defined by surfaces of bearing retainers 18 and 20. Collar 24 is fixed to and rotates with power shaft 10, and the collar radially extends outward from the shaft into cavity 30. Thrust plates 26 and 28 are ring-shaped and are positioned within cavity 30, radially spaced from and encircling shaft 10. Preferably there is a close radial lift between plates 26 and 28 and bearing retainers 18 and 20 to limit radial movement of the plates. Front thrust plate 26 is axially positioned between a front side of the thrust collar 24 and the surfaces of bearing retainers 18 and 20 defining lateral cavity 30, and back thrust plate 28 is axially positioned between a back side of the thrust collar and the surfaces of the bearing retainers defining the lateral cavity. Plates 26 and 28 are free to rotate within cavity 30, but retainers 18 and 20 limit axial movement of the thrust plates. Similarly, collar 24 is free to rotate within cavity 30 between plates 26 and 28, but the plates limit axial movement of the thrust collar and, hence, power shaft 10. A thin film of lubricant (not shown) is maintained between adjacent surfaces of retainers 18 and 20, collar 24, and plates 26 and 28, lubricating these surfaces.

Particularly referring to FIG. 1, each bearing sleeve 22 defines a circumferentially extending notch or slot 32, and oil ring 34 is mounted on and drivingly engaged by shaft 10 between the axial edges of each notch 32. Oil rings 34 have a diameter greater than the diameter of power shaft 10, and the oil rings encircle the power shaft. With this arrangement, rotation of power shaft 10 causes rotation of oil rings 34, with the oil rings rotating at a slower rate than the power shaft. A pool or supply of lubricant 36 is disposed within casing 12 beneath oil rings 34 in the path of travel thereof as the oil rings rotate under the influence of shaft 10. As oil rings 34 rotate, lubricant clings thereto and is elevated thereby, and the inner surfaces of the oil rings may be provided with grooves (not shown) to facilitate lifting lubricant from supply 36.

A first portion of a lubricant raised by oil rings 34, primarily the lubricant carried upwards by the inner surfaces of the oil rings, is deposited on surfaces of shaft 10 and bearing sleeves 22. The lubricant axially migrates along these surfaces, providing the thin film of lubricant between adjacent surfaces of shaft 10, bearing retainers 18 and 20, and bearing sleeves 22. Eventually, the lubricant axially migrates across the bearing surfaces of journal bearing assembly 14 and returns to supply 36. A second portion of the lubricant carried upward by oil rings 34, specifically lubricant carried upward by outer surfaces of the oil rings, is radially thrown outward by the rings under the action of centrifugal force.

Figure 2:
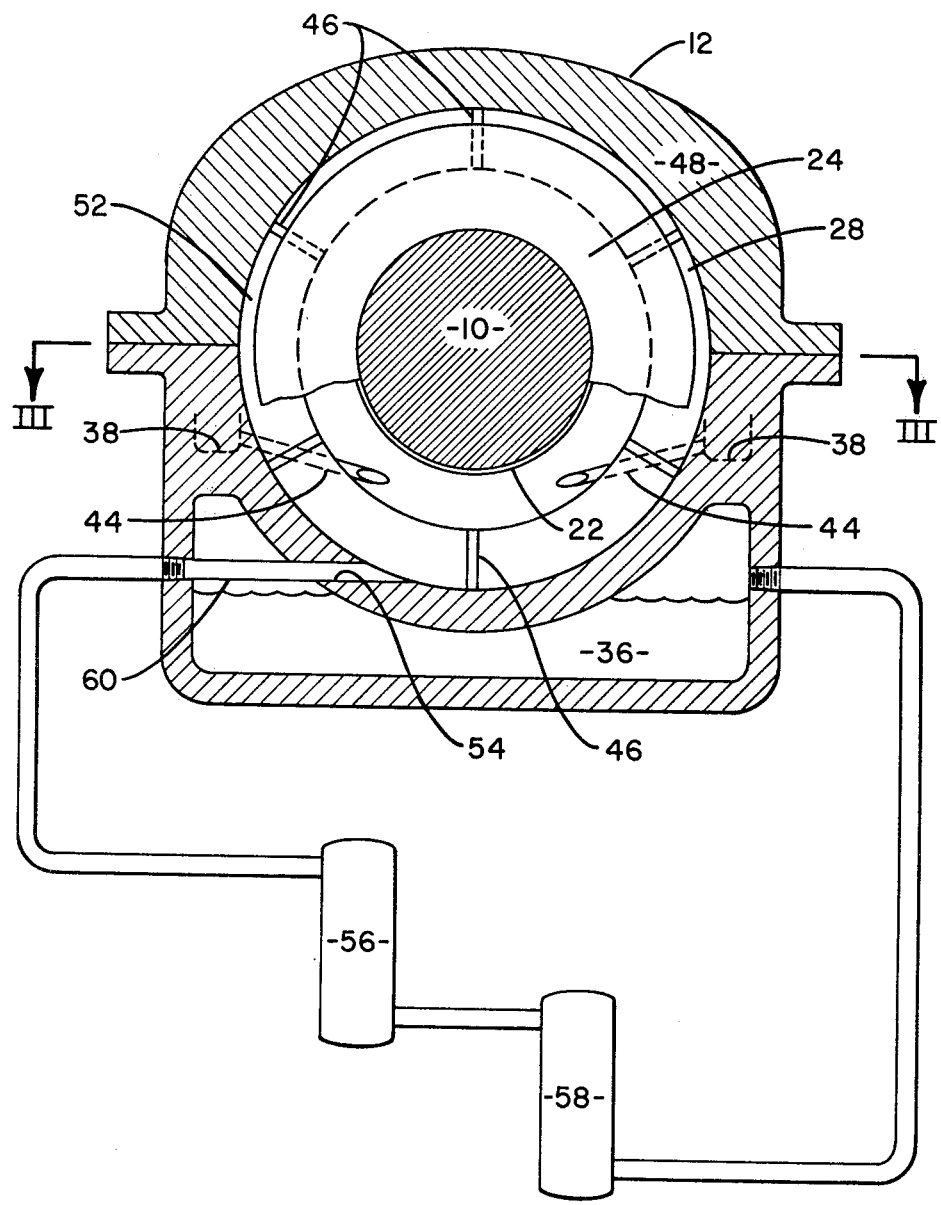
FIG. 2 is a front cross-sectional view taken along line II—II of FIG. 1 with portions of the thrust collar removed.
Figure 3:
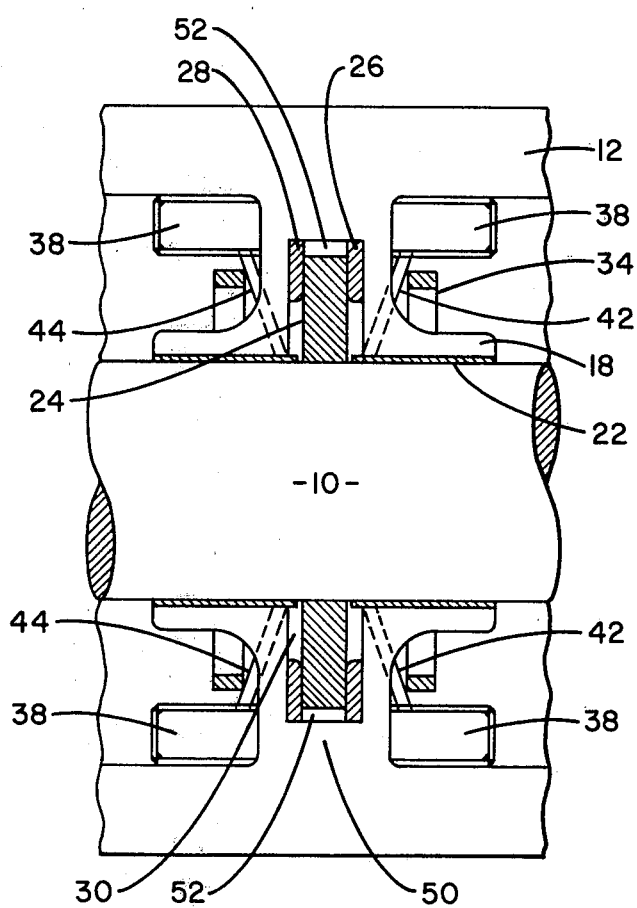
FIG. 3 is a top cross-sectional view taken along line III—III of FIG. 2.

The system of the present invention comprises trough means for collecting a quality of the lubricant radially thrown outward by oil rings 34, prior to said quantity returning to lubricant supply 36, and conduit means for conducting the collected quality of lubricant from the trough means into thrust bearing assembly 16 to lubricate surfaces thereof. Preferably, as shown in FIGS. 2 and 3, the trough means includes a plurality of collection troughs 38 secured to casing 12 to either side of shaft 10. The conduit means includes, in the preferred arrangement, a pair of front channel means 42 and a pair of back channel means 44, wherein one front channel means and one back channel means is located on each side of power shaft 10.

Channel means 42 and 44 guide lubricant from collecting troughs 38 into lateral cavity 30. More specifically, front channel means 42 guides lubricant into the area radially below shaft 10 and inside front thrust plate 26 and axially between thrust collar 24 and lower bearing retainer 20. Analogously, back channel means 44 guides lubricant into the area radially below shaft 10 and inside back thrust plate 28 and axially between thrust collar 24 and lower bearing retainer 20. The lubricant introduced into thrust bearing assembly 16 by first and second channel means 42 and 44 radially and circumferentially migrates along surfaces of bearing retainers 18 and 20, thrust collar 24 and thrust plates 24 and 26, lubricating these surfaces. The migration of the lubricant along the surfaces of thrust bearing assembly 16 is assisted by the relative motion between bearing retainers 18 and 20, thrust collar 24, and thrust plates 26 and 28 and by a plurality of circumferentially equally spaced radial grooves 46 (shown only in FIG. 2) defined by the surfaces of thrust plates 26 and 28 adjacent to the thrust collar.

Thus, it can be seen that the present invention utilizes lubricant radially through off oil rings 34, which, with prior art arrangements, normally returns directly to lubricant supply 36, to lubricate thrust bearing assembly 16 and, in this manner, provides a single lubrication system to lubricate both journal bearing assembly 14 and thrust bearing assembly 16. The necessity for a separate lubrication system for each bearing assembly is eliminated, reducing the cost of and simplifying the construction, operation, and maintenance of the rotatable machine.

Preferably, upper bearing retainer 18 includes upper sleeve member 48 and lower bearing retainer 20 includes lower sleeve member 50. Sleeve members 48 and 50 annularly encircle thrust plates 26 and 28 and thrust collar 24. Sleeve members 48 and 50 are in a close radial fit with thrust plates 26 and 28 throughout the circumference thereof, but sleeve members 48 and 50 are radially spaced from the thrust collar. With this arrangement, sleeve members 48 and 50, thrust plates 26 and 28 and thrust collar 24 define annular chamber 52. As lubricant migrates across surfaces of thrust collar 24 and reaches the outside surface thereof, the lubricant is radially thrown outward by the thrust collar into chamber 52 under the action of centrifugal force. Referring to FIG. 2, aperture 54 is provided in lower sleeve member 50 for passing lubricant from annular chamber 52 and through the lower sleeve member for returning the lubricant to supply 36.

The centrifugal force applied to the lubricant by thrust collar 24 increase the pressure of the lubricant in chamber 52. This increased pressure may be employed to circulate the lubricant between thrust bearing assembly 16 and a remote location without the need for a separate lubricant pump and its associated costs of manufacture, operation, and maintenance. For example, the lubricant can be circulated to another bearing assembly or an external piece of machinery. For example, referring to FIG. 2, the lubricant may be circulated through oil filter 56 and oil cooler 58, and back to supply 36 via oil line 60.

While it is apparent that the invention herein disclosed is well calculated to fulfill the objects above-stated, it will be appreciated that numerous modifications and embodiments may be devised by those skilled in the art, and it is intended that the appended claims cover all such modifications and embodiments as fall within the true spirit and scope of the present invention.

I claim:

1. A lubrication method for use with a rotary machine having a lubricant supply, a rotatable shaft, and a bearing assembly defining an annular cavity and including a journal bearing assembly rotatably supporting the shaft, and a thrust bearing assembly limiting axial movement of the shaft, wherein the thrust bearing assembly includes a thrust collar secured to the shaft and radially extending outward therefrom into the annular cavity, the lubrication method comprising the steps of:

raising lubricant from the supply thereof to lubricate surfaces of the journal bearing assembly, wherein a portion of the raised lubricant is thrown radially outward;

collecting a quantity of said portion of lubricant prior to said quantity of lubricant returning to the lubricant supply;

conducting the collected quantity of lubricant radially inward into the annular cavity;

conducting lubricant radially outward along the thrust collar, wherein rotation of the thrust collar throws lubricant outward therefrom;

collecting lubricant thrown from the thrust collar in the annular cavity; and conducting lubricant from the annular cavity, to a remote location, and back to the lubricant supply.

2. The lubrication method as defined by claim 1 wherein the step of conducting lubricant from the annular cavity includes the step of conducting lubricant from a bottom portion of the annular cavity.

3. The lubrication method as defined by claims 1 or 2 wherein the thrust bearing assembly further includes a thrust plate located adjacent to the thrust collar and wherein the step of conducting lubricant radially outward along the thrust collar includes the step of passing lubricant through radial grooves defined by the thrust plate.

* * * * *